United States Patent [19]

Janssen et al.

[11] Patent Number: 6,045,695
[45] Date of Patent: Apr. 4, 2000

[54] BIOLOGICAL TREATMENT OF SPENT CAUSTICS

[75] Inventors: Albert Joseph Janssen, Sneek; Gatze Lettinga, Oudeschoot; Cees Jan Nico Buisman, Harich; Jan Bontsema, Wageningen; Gerrit Van Straten, Doorwerth; Johannes Gijsbrecht Kuenen, Delft; Jolyn Martha Maria De Zwart, Schipluiden, all of Netherlands

[73] Assignee: Paques Bio Systems B.V., Balk, Netherlands

[21] Appl. No.: 09/230,585

[22] PCT Filed: Jul. 23, 1997

[86] PCT No.: PCT/NL97/00437

§ 371 Date: Feb. 10, 1999

§ 102(e) Date: Feb. 10, 1999

[87] PCT Pub. No.: WO98/04503

PCT Pub. Date: Feb. 5, 1998

[30] Foreign Application Priority Data

Jul. 29, 1996 [EP] European Pat. Off. ............. 96202138

[51] Int. Cl.$^7$ ................................. C02F 3/34; C02F 1/58
[52] U.S. Cl. ...................... 210/611; 210/614; 210/620; 210/916
[58] Field of Search ..................... 210/610, 611, 210/614, 620, 631, 916; 435/282, 822, 911

[56] References Cited

U.S. PATENT DOCUMENTS

| 5,366,633 | 11/1994 | Buisman | 210/614 |
| 5,474,682 | 12/1995 | Buisman | 210/610 |
| 5,480,550 | 1/1996 | Sublette | 210/611 |
| 5,518,619 | 5/1996 | Buisman | 210/611 |
| 5,637,220 | 6/1997 | Buisman | 210/610 |

FOREIGN PATENT DOCUMENTS

| 0 436 254 | 7/1991 | European Pat. Off. . |
| WO 91/16269 | 10/1991 | WIPO . |
| WO 94/29227 | 12/1994 | WIPO . |

*Primary Examiner*—Thomas G. Wyse
*Attorney, Agent, or Firm*—Young & Thompson

[57] ABSTRACT

A process for the biological treatment of a spent caustic solution containing sulphides is disclosed, wherein the solution is introduced into an aerobic reactor containing sulphide-oxidising bacteria, and the sulphides are partly converted to elemental sulphur and partly to sulphate by controlling the redox potential in the reactor at a value below −300 mV (against an Ag/AgCl reference electrode), or below −97 (against a $H_2$ reference electrode). Also disclosed is process for the biological treatment of an aqueous solution containing sulphides and/or mercaptans in an aerobic reactor, wherein the solution is treated in the presence of bacteria of the new species *Methylophaga sulfidovorans*.

13 Claims, 1 Drawing Sheet

BIOLOGICAL TREATMENT OF SPENT CAUSTICS

FIELD OF THE INVENTION

The invention relates to the biological treatment of spent caustics resulting from the removal of sulphides from hydrocarbon sources.

BACKGROUND

Sodium hydroxide solutions are used in petroleum refining and chemical industries to remove hydrogen sulphide from various hydrocarbon streams. When the sulphide has reacted with the sodium hydroxide, the resulting solution is usually referred to as spent sulphidic caustic. Depending on the hydrocarbon source, spent caustics may also contain phenols, mercaptans, amines and other organic compounds that are soluble or emulsified in the caustic. Spent caustics typically have a pH greater than 12 and sulphide concentrations exceeding 2 wt. % (≈a more than 0.6 mol/l).

At the moment, spent caustics are usually treated by the "wet air oxidation", wherein sulphides and mercaptans are oxidised chemically at high pressures and temperatures. This process is expensive because of the required chemicals, and leads to residual waste in the form of gaseous sulphur dioxide and liquid sulphuric acid and sulphate. Another known method of disposal of spent caustic is deep well injection, which is also expensive.

A biological process for the treatment of spent caustics was described by Rajganesh, Sublette, Camp and Richardson, *Biotechnol. Prog.* 1995 (11), 228–230. In this process, sulphides are completely oxidised to sulphate by *Thiobacillus denitrificans*. However, the production of only sulphate is often not desirable because the pH may become too low. This known process also requires nitrate, which has to be added to the spent caustics, leading to additional costs for chemical requirements.

SUMMARY OF THE INVENTION

It has been found now that the biological treatment of spent caustics and similar waste streams can be improved by controlling the redox potential of the biological treatment medium so as to partly or predominantly produce elemental sulphur in addition to sulphate.

It has furthermore been found that the treatment of spent caustics also containing mercaptans can be accomplished by using bacteria of the novel strain *Methylophaga sulfidovorans*.

DETAILED DESCRIPTION OF THE INVENTION

In a first aspect, the invention pertains to a process for the biological treatment of a spent caustic solution containing sulphides and possibly other sulphur compounds, wherein the sulphides are partly converted to elemental sulphur and partly to sulphate.

The biological oxidation of sulphide by aerobic Thiobacilli can be represented by the following equations, especially (1) and (2):

(1)

(2)

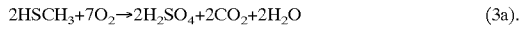
(3a).

In reaction (1) sulphur is formed with an increase in pH, whereas in reaction (2) sulphate is formed with a drop in pH.

In order to cause the oxidation to proceed partly or predominantly through reaction (1), one could in principle use a low oxygen concentration, since the higher the oxygen concentration is, the more sulphate is formed. However, at moderate sulphide loading rates (up to about 250 mg/l.h), sulphate production is already complete at oxygen levels as low as 0.1 mg/l, which is about the detection limit. One could also use a high sulphide load, but this leads to increased mercaptan loads which are difficult to biodegrade.

It was surprisingly found, that the sulphide oxidising reaction can be controlled towards partial or predominant sulphur formation by adjusting the redox potential of the medium of the oxidation at a value below −300 mV (against an Ag/AgCl reference electrode). The following redox ranges were found: at a redox potential below −360 mV (against an Ag/AgCl reference electrode), hydrogen sulphide is completely converted to elemental sulphur; at a redox potential between −360 and −300 mV (against an Ag/AgCl reference electrode), hydrogen sulphide is partially converted to elemental sulphur and partially to sulphate; at a redox potential above −300 mV (against an Ag/AgCl reference electrode), hydrogen sulphide is completely converted to sulphate. The range of −300/−360 mV against Ag/AgCl corresponds to a range of −97/−157 mV against a $H_2$ reference electrode at 30° C. This allows an optimum sulphide removal combined with an effective neutralisation of the spent caustics, so that they can be safely discharged.

Preferably the redox potential is controlled such that the sulphate level produced results in neutralisation (pH 6–9) of the spent caustics. The preferred redox potential range is from −300 to −390 mV, more preferably from −320 to −360 mV, optimally from −340 to −350 mV (against Ag/AgCl, corresponding to −137 to −147 mV against $H_2$), at 30° C., pH=8. A more detailed description of the process control using the redox potential is given below.

In order to avoid too high local pH's in the aerobic bioreactor, the incoming spent caustics solution should be well dispersed in the reactor medium. As a useful alternative, the spent caustics can be diluted with effluent from the aerobic reactor to lowers its pH. This can be done e.g. in a premixing tank. The oxidation can be carried out using sulphide-oxidising bacteria of the genera Thiobacillus, Thiomicrospira and related microorganisms. The bacteria can be used as such, or on a dispersed carrier, or can be immobilised on a solid carrier. The effluent can be treated in a conventional manner: elemental sulphur can be separated off by settling or centrifuging and be reused or burnt. Sulphate can be discharged and thiosulphate, if any is formed, may be biologically converted to other sulphur compounds.

In another aspect, the invention concerns the use of a novel sulphur-oxidising bacterium in the treatment of waste water containing mercaptans and/or other sulphur compounds. The novel Gram-negative bacterium has been named *Methylophaga sulfido-vorans*. The strain RB-1 thereof was obtained from a microbial mat from an estuarine intertidal region (Oosterschelde, the Netherlands). A sample has been deposited at the Delft Culture Collection (LMD 95.210). It exhibits 98.8% and 98.3% 16S rRNA similarity with *Methylophaga thalassica* (DSM 5690), and *M. marina* (DSM 5689), respectively. The bacteria are irregular, oval-shaped rods of 0.2 by 0.9 μm, having polar flagellum. Catalase and oxidase are positive. The GC content of the bacterial DNA is 42%. Optimum temperature is 22° C. growth occurs between 17 and 35° C. Optimum pH is between 7 and 7.5. They use the ribulose monophosphate route for carbon assimilation. It is an obligately methylotrophic organism.

*Methylophaga sulfidovorans* grows on methanol, formaldehyde, methylamine, dimethylamine, dimethyl sulphide, methyl mercaptan and hydrogen sulphide. No growth was detected on trimethylamine, methane and methanesulphonic acid. It cannot oxidise thiosulphate, elemental sulphur and formate.

The oxidation of methyl mercaptan and dimethyl sulphide is proceeds along the following equations:

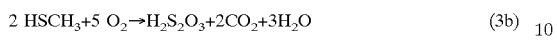

$$2\ HSCH_3 + 5\ O_2 \rightarrow H_2S_2O_3 + 2CO_2 + 3H_2O \tag{3b}$$

$$2\ CH_3SCH_3 + 8\ O_2 \rightarrow H_2S_2O_3 + 4\ CO_2 + 5H_2O \tag{4}$$

The bacteria of the species *Methylophaga sulfidovorans* are used according to the invention for converting hydrogen sulphide, mercaptans and organic sulphides like methyl mercaptan, dimethyl sulphide and dimethyl disulphide, to higher oxidised species, in particular thiosulphate. Thus the invention pertains to any process of biological sulphur removal wherein the new species is used.

The *Methylophaga sulfidovorans* can be used in generally the same way as conventional sulphide-oxidising bacteria. It is preferred, however that the salinity of the aerobic reactor is close to the value of seawater, which means a salt concentration (NaCl) between about 30 and 40 g/kg, in particular between 33 and 37 g/kg. If the solution to be treated has a substantially different salinity, this can be adapted by the addition of sodium salts or by dilution, e.g. with tap water, as the case may be. In particular, the sodium concentration in the aerobic reactor is preferably adjusted to at least 11 g/l, more in particular to between 12 and 17 g/l, especially about 14 g/l. Alternatively, the electric. conductivity is preferably adjusted to between 30 and 50 mS/cm, especially about 40 mS/cm.

If the waste water to be treated with the novel bacteria contains appreciable levels of sulphide (HS⁻), the medium should contain a sufficient level of methyl sources, such as methanol, methyl mercaptan, dimethyl sulphide, methylamine, or the like. If the molar concentration of sulphide is more than twice the molar concentration of methyl sources, methyl sources such as methanol are preferably added to achieve said minimum of 1:2.

The major product of sulphide oxidation by *M. sulfidovorans* is thiosulphate. Usually thiosulphate is an undesirable component in waste water. Therefore, it is preferred then to combine the use of the novel bacteria with bacteria capable of converting thiosulphate to sulphate and/or sulphur. Preferred bacteria for this purpose are those of the genus Thiobacillus, most preferred are those of the species *T. thioparus*.

The novel bacteria can also be used in biological treatment of spent caustics, more especially when it is performed with redox potential control as described above.

Redox Potential Control

The microbiological oxidation of sulphide to elemental sulphur occurs either under oxygen limited circumstances, that is at DO (Dissolved Oxygen) values below, at least, 0.1 mg·L⁻¹ or under high sulphide loading rates. In the latter case, the biomass is overloaded and sulphur is formed as intermediate product. Since it is assumed that the formation of sulphur is a faster reaction than sulphate-formation, this mechanism allows the bacteria to remove the harmful sulphide at high rates.[4] As follows from the pε–pH diagram for the $SO_4$—S(s)—$H_2S$ system, elemental sulphur is not a stable sulphur compound at pH=8.[3,9] At pH values below 7, elemental sulphur is formed from the oxidation of $H_2S$ while in the pH range 7–11, HS⁻ would under thermodyanamic equilibrium conditions be completely oxidised to sulphate. However, since a bioreactor is a non-equilibrium system, a conceptually meaningful pε cannot be defined.[9] Also the intercellular pH may be different from that of the reactor suspension, resulting in different sulphide species. As a consequence, the redox reactions which occur may differ from the thermodynamically predicted ones.

At loading rates below 250 mg HS⁻L⁻¹h⁻¹, the Thiiobacillus and similar organisms tend to produce sulphate rather than sulphur at increasing DO-values because sulphate formation yields more energy for microbial growth.[4] For reasons of environmental protection, the formation of elemental sulphur is preferred because this compound can, in principle, be removed from the waste water and subsequently be re-used as a raw material, e.g. in bioleaching processes.[10] Reactors should not be designed to be operated under 'overload conditions' for the sake of process-stability. Therefore, a stoichiometrical oxygen supply is required to oxidise all sulphide into elemental sulphur. Since the detection limit of currently available oxygen sensors is about 0.1 mg.L⁻¹, they are not suitable as a measuring device and therefore another parameter should be used. A very useful alternative to control the oxygen supply is the application of the redox (reduction-oxidation) potential of the solution. The successful application of the redox potential as a control parameter for the nitrification/denitrification process in biological waste-water treatment plants and its use for controlling the enhanced biological phosphorous removal has already been demonstrated successfully.[7] The redox potential is a measure of the solution's tendency to accept or donate electrons. The thermodynamic relation of the potential $E_H$ to the composition of the solution is generally known as the Nernst equation:[9]

$$E_H = E_H^0 + \frac{2.303 \cdot R \cdot T}{n \cdot F} \log \frac{\Pi_i \{ox\}^{n_i}}{\Pi_j \{red\}^{n_j}}$$

for the half-reaction: $n_i$ ox$_i$+n e→$n_j$ red$_j$. One drawback frequently mentioned concerning the application of the redox potential is, that its value is the result of the contribution of a mixture of dissolved components. Several redox couples may prevail and all of them contribute to the measured, overall, redox value. However, several authors revealed the existence of a linear relationship between the measured redox potential and the logarithm of the hydrogen sulphide concentration in natural environments.[1, 5, 6] The reason for this is that, in comparison to other substances, sulphide has a relatively high standard exchange current density ($I_0$).[2] In a sulphide oxidising bioreactor, the measured redox potential therefore will predominantly be determined by the sulphide concentration. Instead of redox potential measurements, one could also consider the use of a commercially available, ion-specific, sulphide electrode which measures the activity of the S²⁻ ion. However, the use of such an electrode is not recommended because the S²⁻ concentration greatly depends on the pH of the solution. In practice, small pH-fluctuations will result in considerable fluctuations in the S²⁻ concentration. The measured S²⁻ concentration should therefore always be correlated to the actual pH-value which complicates its application considerably. The redox potential, however, is found to depend less on the pH of the solutions. Another reason for not using ion-specific sulphide electrodes (i.s.e.) is that they are not yet available for industrial purposes.

Materials and Methods

Reactor

A continuous-flow gaslift reactor was used with a liquid volume of 10 L. The influent consisted of tap water and a nutrient solution. The gas flow (300 L·h$^{-1}$) was completely recycled to prevent any release of H$_2$S-gas into the environment and to reach low oxygen concentrations. Pure (100%) hydrogen sulphide gas was added to this recirculating gas stream via Mass Flow Controllers (Brooks Thermal Mass Flowmeter, type 5850E, 0–75 mL·min$^{-1}$). Under slightly alkaline conditions (pH=8), the H$_2$S gas was completely absorbed into the liquid phase; in the headspace no H$_2$S gas could be detected. Pure oxygen was supplied by means of two Mass-Flow Controllers (Brooks Thermal Mass Flowmeter, type 5850E, flow 0–30 mL.min$^{-1}$ and 0–500 mL.min$^{-1}$). The temperature was controlled at 30° C. by a water-jacket.

Measurements and Analyses

In the reactor, the redox potential was measured with two commercially available, polished, platinum electrodes combined with an Ag/AgCl electrode as a reference (WTW, Serolyt Pt). In order to assess the effect of the polished electrode surface, a calibration in a phosphate buffer (KH$_2$PO$_4$=20 g.L$^{-1}$, pH=8.0) was carried out with a platinised electrode (platinunm black). Platinisation of a polished platinum electrode increases the specific surface by a factor 100–1000. Consequently, reactions whereby electrons are transferred to such a platinised electrode surface, i.e. heterogeneous reactions, may proceed faster when the available surface area of the standard polished electrode is the limiting factor.[2] Platinisation of the electrode was accomplished according to the following procedure. A polished platinum-electrode was cleaned for half an hour in a concentrated (65%) nitric-acid solution at 70° C. After thorough rinsing with distilled water, the electrode surface was electrochemically cleaned (10 minutes) in distilled water which was acidified with a few droplets of a concentrated (96%) sulphuric acid solution. The direction of the current (10 mA·cm$^{-2}$) was changed once every minute. Then, the electrode was rinsed with distilled water and electrolysed in a 2% H$_2$PtCl$_6$.6H$_2$O solution. Electrolysis was started for a period of 5 minutes at a current of respectively +10 and −10mA·cm$^{-2}$. The current was increased in steps of 10 mA·cm$^{-2}$ up to a final value of 50 mA·cm$^{-2}$. Simultaneously, a black deposit was formed on the Pt-surface. All redox values presented in this chapter are expressed relative to the standard hydrogen electrode.

Sulphide was measured on-line with an ion-specific sulphide (i.s.e.) electrode which consisted of a silver-wire which was embedded in solidified resin. The silver tip was first thoroughly cleaned with a detergent solution and polished. Hereafter, the electrode was activated by immersing it for 2 minutes in a 20% (NH$_4$)$_2$S solution followed by thorough rinsing with tap water. In this way, an Ag$_2$S-coating was created on the silver surface which actually served as electrode surface. Free S$^{2-}$ ions adsorb onto the Ag$_2$S-crystal and release their electrons. The current was measured with a standard potentiometer. A standard Ag/AgCl electrode was used as a reference. The sulphide-electrode was calibrated in a double wall, air-tight vessel (V=250 mL, T=30° C.) which was filled with 100 mL of an oxygen-free phosphate buffer (KH$_2$PO$_4$=20 g·L$^{-1}$, pH=8.0). The headspace was flushed with nitrogen before addition of a 100 mM sulphide stock solution. The sulphide stock solution was added in steps of 0.05mL, using an automatic burette (Dosimat 665, Metrohm, Hercsau, Switzerland). The following calibration curve for the sulphide electrode was found: E=32.5×p(HS$^-$)−446 (mV); p(HS$^-$)=−log[HS$^-$]in mg·L$^{-1}$, in a range of 0.5 till 10 HS$^-$ mg·L$^{-1}$. In this way 30 measurements were made and the correlation coefficient found was 0.99. lhe slope of the line is close to the theoretical slope of −30 mV/p(HS$^-$). The dissolved oxygen concentration was measured using an oxygen sensor (WTW; DU 600 210). The pH in the reactor was maintained at 8.0 (±0.1) by the addition of a 0.5 M Na$_2$CO$_3$ solution, using a custom-made pH-controller. The flow of the nutrient solution ranged from 5 mL×h$^{-1}$ till 25 mL×h$^{-1}$. The signals from respectively the oxygen, sulphide and redox electrodes and the mass-flow controller were collected via a custom made data-logger (Workshop, Dept. of Agricultural Engineering and Physics, Wageningen Agricultural University: WAU). A software PI-controller was developed using the MATLAB software-package (The Mathworks Inc., Mass.). With this program the measuring data was also collected. The sample interval was set at 1 minute for experiments with constant sulphide and oxygen loading rates whereas the sample interval was set at 30 seconds for the experiments with a computer-controlled oxygen dosage. Sulphate and thiosulphate were measured using a HPLC. The sulphide concentration was determined using the colorimetrical assay of Truper and Schlegel.[11]

Results and Discussion

The relation between the redox potential and the H$_2$S and O$_2$ loading rates was assessed from a number of steady-state situations. Four different H$_2$S-loading rates were applied, viz 50, 100, 175 and 500 mg HS$^-$·L$^{-1}$h$^{-1}$. At each sulphide loading rate from one up to four different oxygen loading rates were applied. The molar oxygen to sulphide consumption ratio amounted to respectively 0.38, 0.51, 0.77, 1.15 or 1.54. Each steady-state was maintained for at least 24 hours. It follows that at a molar (O$^2$/HS$^-$)$_{consumption}$ of respectively 0.51, 0.77 and 1.15, the redox potential remained more or less constant. At an oxygen supply of less than the minimal amount required to oxidise all sulphide, i.e. when the value of the molar (O$_2$/HS$^-$)$_{consumption}$ is below 0.5, the redox potential decreased from −142 to −161 mV. This is due to the accumulation of sulphide (as will be discussed below). Only at a molar (O$^{2/HS-}$)$_{consumption}$ value of 1.54 a strong increase of the redox potential was observed. It would appear that at this ratio, at a loading rate of 50 mg HS$^-$·L$^{-1}$h$^{-1}$ the sulphide concentration was very low, resulting in small absolute values of the measured redox potential whilst at a loading rate of 500 mg HS$^-$·L$^{-1}$ h$^{-1}$ the redox potential fluctuated strongly (±85 mV). This may be the result of an accumulation of oxygen ([O$_2$]=1.0 mg·L$^{-1}$). Since at this loading rate the biomass becomes overloaded, sulphur is the predominant oxidation product and consequently not all oxygen is consumed.

At a loading rate up to 175 mg HS$^-$·L$^{-1}$h$^{-1}$ a linear relationship is found between the sulphate formation and the ratio oxygen/sulphide consumption. At a loading rate of 500 mg HS$^-$·L$^{-1}$ h$^{-1}$, however, less sulphate is formed than the maximal possible amount due to overloading of the biomass under these conditions, probably resulting in a reduction of the cytochrome chains of the organisms.[8]

Origin of the Redox Potential

The redox potential is an 'overall' parameter which means that the oxidation and reduction of a variety of (sulphur) compounds can attribute to its value. The oxidation of sulphide to sulphur and sulphate and the reduction of oxygen in water are the major redox changes. The measured redox potential will thus be determined by these reactions. The value of the measured redox potential depends in principle on the standard potentials (E$^H_O$) of the half-reactions and the concentration of the reactants. The redox potential can only be calculated with the Nernst equation, if a thermodynamic equilibrium exists. In practice however, the measured redox potential is mainly determined by the compound with the highest current exchange density, i.e. the ability to exchange electrons with the platinum surface. This means that the measured redox potential is kinetically determined rather than being dependent on the concentration of all dissolved reactants.[2] Sulphide ($S^{2-}$ or $HS^-$) is a compound with a relatively high current exchange density at a platinum surface whereas oxygen has a very low value.[5] This means that in a sulphide oxidising bioreactor the value of the redox potential is determined by the sulphide concentration. In three different experiments the relationship between the redox potential and the sulphide concentration, measured with an i.s.e. electrode, is measured. A linear relationship exists between the sulphide concentration and the redox-potential. The data were collected every 30 seconds from an experiment in which the sulphide and oxygen loading rates were not in a steady-state. Because the redox electrode responds slower to changing sulphide concentrations than the i.s.e. electrode does, a number of redox values were measured at each i.s.e. electrode-potential. The regression line is therefore drawn between the points with lowest redox values. This results in the following relation between the redox-potential and the sulphide concentration: $E=-42*\log[HS^-]-158$, with $[HS^-]$ in $mg \cdot L^{-1}$. The values measured so far, with a normally polished redox electrode, are not in a thermodynamic equilibrium as becomes clear by comparing the results with those which are obtained with a platinised electrode (platinum black). As follows from the titration curve, the calibration line obtained with a platinised electrode has a slope of 35.0 $mV/p(HS^-)$ which is in closer agreement with the theoretically expected value of 30.2 $mV/p(HS^-)$. Laboratory research has shown that the addition of nutrient solution on the measured redox potential has no detectable effect.

The effect of the pH on the response of both electrodes is substantial. The response of the i.s.e. electrode depends linearly on the pH, i.e. it drops with 27 mV per pH-unit (from −445 at pH 7 to −540 at pH 10.5) due to the increase of the concentration $S^{2-}$ ions. Exactly the same value has been found by Visscher et al.[12] This value is close to the theoretically expected value, i.e. 30 $mV/(pS^{2-})$. For the redox electrode, a decrease of 14 mV/pH was found in the pH range 7–10.5, i.e. from −140 (7) to −190 (10.5).

The above results show that the measured values for the blackened electrode are distinctly lower than for the polished electrode, i.e. −412 mV versus −151 mV. This can be attributed to the kinetic limitation of the polished electrode; the blackened electrode accepts more electrons from the sulphide ions.

Real-time Control of The Oxygen Supply at Varying Sulphide Loading Rates

The ratio between the oxygen and sulphide consumption should be as low as possible in order to minimise sulphate formation. However, the redox potential in steady-state should not drop below −150 mV in order to prevent the accumulation of sulphide. In a system operated under a constant sulphide loading rate we investigated which redox levels can be attained. The redox set point for the experiment 6 amounted to −122 mV. The controller compares the measured values for the redox potential with the desired value, i.e. the set point value. From a computer-algorithm an output value for the oxygen-valve was calculated, using the so called P and PI controllers. The redox potential reached the set point value within 4 hours. This time can be reduced by a further optimisation of the gain factor (Kc) and time constant (τ) of the used PI-controller.

Tuning a PI-controller is a precise matter, i.e. choosing the optimal values for the gain factor ($K_c$) and time constant (τ). Since in our system the amount of biomass varies with changing ratios of oxygen to sulphide consumption and also with changing sulphide loading rates, the time-response of the bioreactor may change as well. This means that the PI-controller also requires different sets of gain factors and time constants. Since the tuning of a P-controller is less troublesome than a PI-controller, some experiments with a P-controller were also performed. It was found that during the first 3.5 h of the experiment, the redox potential oscillated around its set point value of −122 mV whereafter it converged to this value. However, after about 11 h of operation, the system apparently became unstable regarding the fact that the redox potential started to oscillate heavily. By repeating the same experiment at a set point value of −147 mV it was found that the measured redox-potential converges faster to its desired value. It can be concluded that the process can be better controlled at lower redox values. Since the measured redox potential depends linearly on the logarithm of the sulphide concentration, fluctuations around the lower set point are therefore smaller and the process stability is therefore higher.

It is hardly possible to maintain a redox set point of −147 mV using a P-controller although this is accompanied with large fluctuations in the oxygen flow. Apparently, the controller becomes an on/off switch. The reason for this is, that the value for the gain factor chosen may be too high. Since the maximum oxygen-flow rate was truncated the system did not become unstable. Regarding the fact that a PI-controller functioned well in experiments with a constant sulphide loading rate, it is expected that a combined P and PI controller is the best control-strategy for experiments with abrupt changes in the sulphide loading rate. The P-controller forces the redox potential to a value within a narrow band around the set point value, e.g. −25 mV<setpocontrol<+50 mV, and from then onwards a PI controller provides an almost constant oxygen flow. Such a combined controller was used for controlling the oxygen flow in an experiment in which the supply of sulphide was changed stepwise.

While the experiment shows that the oxygen-flow oscillated vigorously from 0 to 17.5 $mL \cdot min^{-1}$, i.e. 0–150 $mg \cdot L^{-1} \cdot h^{-1}$, a much more constant oxygen-supply rate is obtained in the experiment with the combined P/PI controller. It follows from the results in that the bioreactor plus P/PI controller responds better to an increase than to a decrease in the sulphide loading rate, i.e. the off-set from the redox set point value at t=4 h and t=10 h is considerably smaller than at t=8 h and t=23 h. The explanation for this is that decreasing the loading rate results in a larger net-change of the redox potential than an increase. As a consequence, the calculated deviation between measured value and the set point value is bigger in the former case. The results also show a periodic change in the redox potential during the period 11–23 h, which cannot yet be explained. In practice, a smooth fluctuation will occur, e.g. in a sinusoidal way, as shown in FIG. 1.

It is possible to control the consumption of oxygen (or another electron acceptor) over sulphide consumption under dynamic conditions, although a decrease in the loading rate results in large fluctuations of the redox potential. The ratio of the molar oxygen over sulphide consumption was found to be 0.38, which is below the stoichiometrical minimum value of 0.5. The reduction of carbon dioxide to biomass is presumably responsible for this effect. Although a very limited amount of oxygen is consumed, still, to some extent sulphate formation occurs (FIG. 2). Apparently, the system is incapable of completely preventing the formation of sulphate. This might be caused by small fluctuations in the dissolved oxygen concentration because at slightly higher DO-values the organisms immediately may switch to sulphate formation.

NOMENCLATURE

Figure 1:
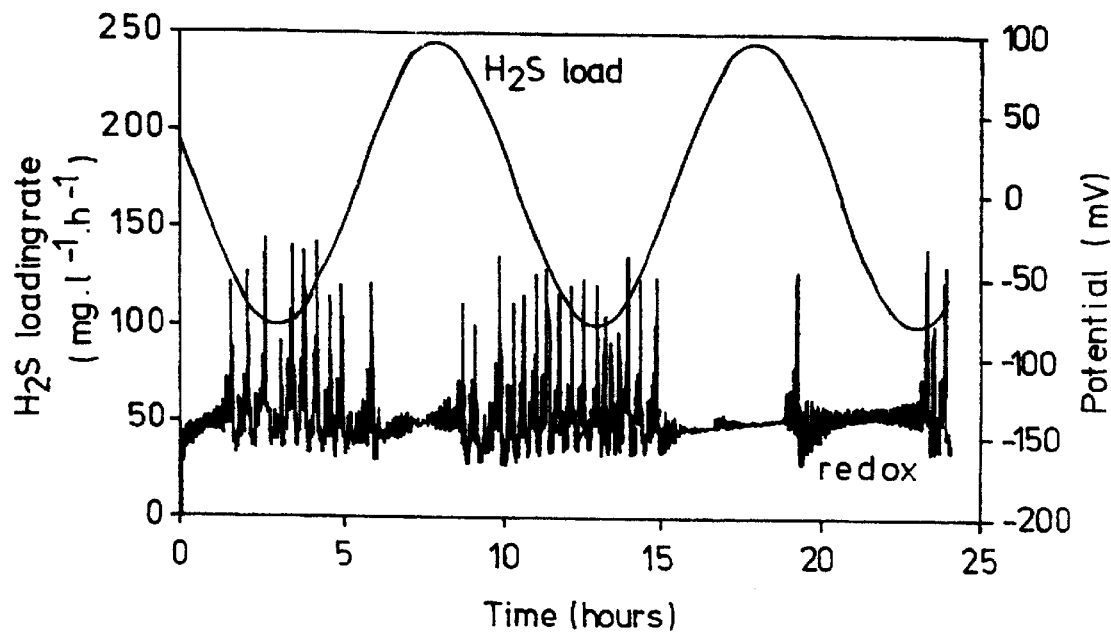
FIG. 1 Effect of an imposed sinusoidal change in the $H_2S$ loading rate at a HRT=5 h; The redox set point was −137 mV and a combined PIPI controller ($K_p$=0.75, $K_c$=1.5, $t_i$=3280 s) was used.
Figure 2:
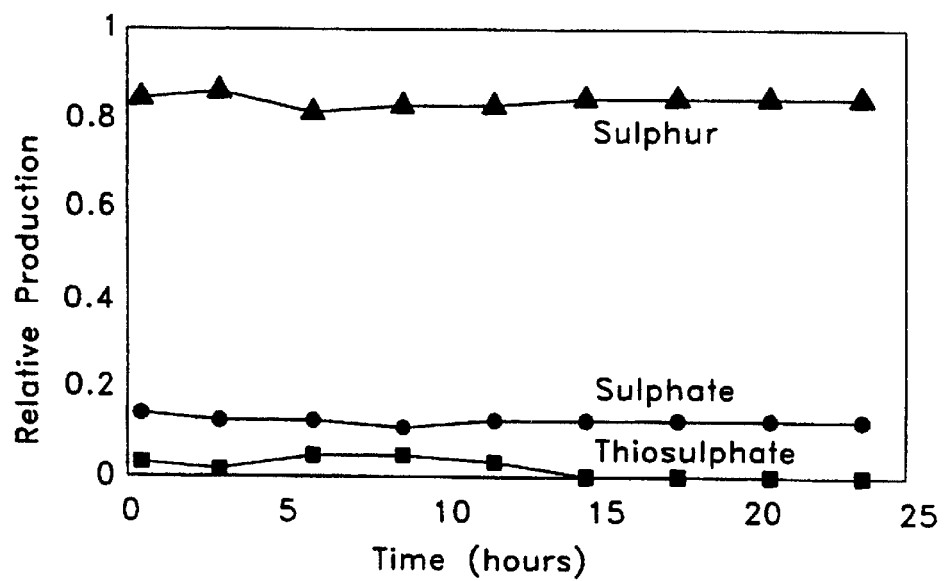
FIG. 2 Relative production of sulphate, thiosulphate (measured) and sulphur (calculated) during the experiment shown in FIG. 1.

| | |
|---|---|
| $\tau_i$ | integral time constant of a PI controller |
| {ox} | activity of oxidisable compounds (mol · L$^{-1}$) |
| {red} | activity of reducible compounds (mol · L$^{-1}$) |
| DO | dissolved oxygen (mg · L$^{-1}$) |
| $E_H$ | half-potential (V) |
| $E^0_H$ | standard half-potential (V) |
| F | Faraday constant (9.6485 · 10$^5$ C · mol$^{-1}$) |
| HRT | hydraulic retention time (h) |
| i.s.e. | ion selective sulphide electrode |
| $K_c$ | proportional gain of the PI-controller |
| n | number of electrons transferred |
| $n_i$ | moles of oxidisable compounds |
| $n_j$ | moles of reducible compounds |
| pε = | ($E_H$ · F)/(2.3 · R · T) |
| R | gas constant (8.31 J · mol $^{-1}$ K$^{-1}$) |
| T | Absolute temperature (K) |
| $V_{gas}$ | volume of the gas-phase (L) |

References

1. Bemner R. A., 1963. Electrode studies of hydrogen sulfide in marine sediments. Geochim. Cosmochim. Acta 27: 563–575
2. Bockris J. O'M and Reddy A. K. N., 1970. Modern Electrochemistry. Plenum Publishing Corporation, New York
3. Boulègue J. 1978. Electrochemistry of reduced sulfur species in natural waters. I. The $H_2S$–$H_2O$ system. Geochim. Cosmochim. Acta 42: 1751–1758
4. Buisman C. J. N., IJspeert P., Hof A. Janssen A. J. H., ten Hagen R., Lettinga, 1991. Kinetic parameters of a mixed culture oxidizing sulfide and sulfur with oxygen. Biotechnol. Bioeng. 38: 813–820
5. Eckert W., 1993. Microbioally-related redox changes in a subtropical lake. 2. Simulation of metalimnetic conditions in a chemostat. Biogeochemistry 21:21–38
6. Frevert T, 1984. Can the redox conditions in natural water systems be predicted by a single parameter? Schweiz. Z. Hydrol. 46: 269–290
7. Heduit A., Thevenot D. R., 1992. Elements in the interpretation of platinum electrode potentials in biological treatment. Wat.Sci.Tech. 26 (5/6): 1335–1344
8. Stefess G. C., 1993. Oxidation of sulphide to elemental sulphur by aerobic Thiobacili. Ph.D. thesis, Technical University Delft, The Netherlands
9. Stumm W., Morgan J. J. 1981. Aquatic chemistry: An introduction emphasizing chemical equilibria in natural waters. Second edition. John Wiley & Sons, New York
10. Tichý R, A. Janssen, J. T. C. Grotenhuis, G. Lettinga, W. Rulkens, 1994. Possibilities for using biologically produced sulphur for cultivation of thiobaclli with respect to bioleaching processes. Biores. Technol. 48: 221–227
11. Trüper H. G., H. G. Schlegel, 1964. Sulphur metabolism in Thiorhodaceae. I. Quantitative measurements on growing cells of *Chromatium okenii*. Antonie Leeuwen-hoek 30: 225–238
12. Visscher P. T., Beukema J., van Gemerden H. 1991. In situ characterization of sediments: Measurements of oxygen and sulfide profiles with a novel combined needle electrode. Limnol. Oceanogr., 36:1476–1480

We claim:

1. Process for the biological treatment of a spent caustic solution having a pH of at least 11 and containing sulphides, wherein the solution is subjected to sulphide-oxidising bacteria in an aerobic reactor, characterised in that the sulphides are partly converted to elemental sulphur and partly to sulphate, the sulphate production resulting in a pH lowering to between 6 and 9, by controlling the redox potential in the reactor at a value between −300 and −360 mV (against an Ag/AgCl reference electrode).

2. Process according to claim 1, wherein the sulplide-oxidising bacteria comprise bacteria of the genus Thiiobacillus.

3. Process according to claim 1, wherein the redox potential is controlled at a value between −320 and −360 mV.

4. Process according to claim 1, wherein the pH of the spent caustic solution is at least 12.

5. Process according to claim 1, wherein a part of the effluent of the aerobic reactor is added to the spent caustics solution before its introduction into the reactor.

6. Process according to claim 1, wherein the solution is treated in the presence of bacteria of the species *Methylophaga sulfidovorans*.

7. Process for the biological treatment of an aqueous solution containing sulphides and/or mercaptans wherein the solution is subjected to sulphide-oxidising bacteria in an aerobic reactor, characterised in that the solution is subjected to bacteria of the species *Methylophaga sulfidovorans*.

8. Process according to claim 6, wherein the conductivity in the aerobic reactor is between 30 and 50 mS/cm.

9. Process according to claim 6, wherein the pH in the aerobic reactor is between 7 and 7.5.

10. Process according to claim 6, wherein the solution is also subjected to bacteria of the genus Thiobacillus.

11. Process according to claim 7, wherein the conductivity in the aerobic reactor is between 30 and 50 mS/cm.

12. Process according to claim 7, wherein the pH in the aerobic reactor is between 7 and 7.5.

13. Process according to claim 7, wherein the solution is also subjected to bacteria of the genus Thiobacillus.

* * * * *